(12) United States Patent
Ishii et al.

(10) Patent No.: US 8,385,186 B2
(45) Date of Patent: Feb. 26, 2013

(54) BASE STATION, MOBILE COMMUNICATION SYSTEM, MOBILE STATION AND COMMUNICATION CONTROL METHOD

(75) Inventors: Hiroyuki Ishii, Yokosuka (JP); Anil Umesh, Yokohama (JP); Kenichi Higuchi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 162 days.

(21) Appl. No.: 12/522,219

(22) PCT Filed: Dec. 5, 2007

(86) PCT No.: PCT/JP2007/073517
§ 371 (c)(1),
(2), (4) Date: Aug. 6, 2009

(87) PCT Pub. No.: WO2008/084612
PCT Pub. Date: Jul. 17, 2008

(65) Prior Publication Data
US 2009/0310556 A1 Dec. 17, 2009

(30) Foreign Application Priority Data
Jan. 9, 2007 (JP) .................................. 2007-001861

(51) Int. Cl.
*H04J 11/00* (2006.01)
*H04J 3/06* (2006.01)
*H04W 4/00* (2009.01)

(52) U.S. Cl. ........ 370/208; 370/328; 370/331; 370/344; 370/503; 455/422.1; 455/436; 455/456.2

(58) Field of Classification Search .................. 370/208, 370/331, 343–344
See application file for complete search history.

(56) References Cited

U.S. PATENT DOCUMENTS

| | | | | |
|---|---|---|---|---|
| 5,502,725 A | * | 3/1996 | Pohjakallio | 370/337 |
| 5,839,071 A | * | 11/1998 | Johnson | 455/440 |
| 5,909,436 A | * | 6/1999 | Engstrom et al. | 370/343 |
| 6,633,559 B1 | * | 10/2003 | Asokan et al. | 370/350 |
| 6,693,892 B1 | * | 2/2004 | Rinne et al. | 370/348 |
| 6,804,212 B1 | * | 10/2004 | Vallstrom et al. | 370/331 |
| 7,164,914 B2 | * | 1/2007 | Moulsley et al. | 455/436 |
| 7,215,967 B1 | * | 5/2007 | Kransmo et al. | 455/456.2 |
| 7,626,974 B2 | * | 12/2009 | Peisa et al. | 370/350 |
| 2003/0153320 A1 | * | 8/2003 | Noerpel et al. | 455/450 |
| 2003/0219037 A1 | * | 11/2003 | Toskala et al. | 370/496 |
| 2004/0082356 A1 | * | 4/2004 | Walton et al. | 455/522 |
| 2005/0215251 A1 | * | 9/2005 | Krishnan et al. | 455/434 |
| 2006/0194579 A1 | * | 8/2006 | Leung et al. | 455/436 |
| 2006/0251027 A1 | * | 11/2006 | Chun et al. | 370/335 |
| 2007/0021070 A1 | * | 1/2007 | Wessel et al. | 455/67.11 |
| 2007/0053339 A1 | * | 3/2007 | Peisa et al. | 370/350 |

(Continued)

OTHER PUBLICATIONS

International Search Report w/translation from PCT/JP2007/073517 dated Mar. 11, 2008 (2 pages).

(Continued)

*Primary Examiner* — Melanie Jagannathan
(74) *Attorney, Agent, or Firm* — Osha Liang LLP (57) ABSTRACT

A base station for communicating to a mobile station that transmits an uplink signal in accordance with a SC-FDMA scheme or an OFDMA scheme includes an adjustment amount range setting unit configured to set an adjustment amount for adjusting a transmit timing of the uplink signal to have different ranges depending on types of a channel transmitted by the mobile station.

8 Claims, 10 Drawing Sheets

U.S. PATENT DOCUMENTS

| | | | |
|---|---|---|---|
| 2007/0072621 A1* | 3/2007 | Mukkavilli et al. | 455/456.1 |
| 2007/0149206 A1* | 6/2007 | Wang et al. | 455/450 |
| 2007/0275760 A1* | 11/2007 | Lundh et al. | 455/560 |
| 2007/0293157 A1* | 12/2007 | Haartsen et al. | 455/67.11 |
| 2008/0070583 A1* | 3/2008 | Tseng et al. | 455/450 |
| 2008/0214177 A1* | 9/2008 | Sehedic et al. | 455/422.1 |

OTHER PUBLICATIONS

Written Opinion from PCT/JP2007/073517 dated Mar. 11, 2008 (3 pages).

3GPP TSG RAN WG1 #47, R1-063476; "E-UTRA UL Timing Control"; Lucent Technologies; Nov. 6-10, 2006 (3 pages).

3GPP TSG RAN WG1 #47bis; R1-070106; "Uplink Timing Control for E-UTRA"; NTT DoCoMo, et al; Jan. 15-19, 2007 (2 pages).

3GPP TSG RAN WG1 #49; R1-072420; "Timing Alignment Method for E-UTRA Uplink"; NTT DoCoMo, et al; May 7-11, 2007 (3 pages).

3GPP TR 25.814 V7.0.0; 3rd Generation Partnership Project; Technical Specification Group Radio Access Network; Physical Layer Aspects for Evolved Universal Terrestrial Radio Access (UTRA); Jun. 2006 (126 pages).

Extended European Search Report for Application No. 07850141.8-2411, mailed on Sep. 16, 2010 (8 pages).

"Uplink Synchronous Transmission Scheme (USTS)" Internet Citation Jul. 4, 2000 XP002185297 Retrieved from the Internet : URL : www.3gpp.org/ftp/tsg_ran/WG1_RL1/TSGR1_14/Docs/PDFs/R1-00-0903 .pdf.

ZTE: "Uplink Timing Control Signal Resource Allocation" 3GPP Draft; R1-060121 Uplink Timing Control Signal Resource Allocation, 3rd Generation Partnership Project (3GPP), Mobile Competence Centre ; 650, Route Des Lucioles ; F-06921 Sophia-Antipolis Cedex ; France, [Online] vol. RAN WG1, No. Helsinki, Finland; 20060123, Jan. 19, 2006, XP050417495 Retrieved from the Internet : URL: http://www .3gpp. org/ftp/tsg_ran/wg1_rl1/TSGR1_AH/LTE_AH_January-06/Docs/R1-060121 .zip>.

IPWIRELESS: "Preferences for UL Timing Control" Nov. 1, 2006, 3GPP Draft; R1-063508, 3rd Generation Partnership Project (3GPP), Mobile Competence Centre ; 650, Route Des Lucioles; F-06921 Sophia-Antipolis Cedex; France, XP050103942.

Siemens: "Draft LS Response to RAN2 LS on Synchronization at Handover" , [Online] vol. R1-070599, No. 47BIS, Jan. 15, 2007, pp. 1-2, XP002484698 Retrieved from the Internet : URL: http ://www. 3gpp.org/ftp/tsg_ran/WG1_RL1/TSGR1_47bis/Docs/R1-070599.zip>.

LG Electronics Inc: "How to transmit TA information" 3GPP Draft; R2-070530_How to Transmit TA_REV1.0, 3rd Generation Partnership Project (3GPP), Mobile Competence Centre ; 650, Route Des Lucioles ; F-06921 Sophia-Antipolis Cedex ; France, vol. RAN WG2, no. St. Louis, USA; 20070209, Feb. 9, 2007, XP050133584.

Qualcomm Europe: "Timing control for UL transmissions" 3GPP Draft; R1-062702, 3rd Generation Partnership Project (3GPP), Mobile Competence Centre ; 650, Route Des Lucioles; F-06921 Sophia-Antipolis Cedex ; France, vol. RAN WG1, no. Seoul, Korea; 20061004, Oct. 4, 2006, XP050103190.

Russian Office Action for Application No. 2009129501/08, mailed on Oct. 5, 2011 (15 pages).

Ericsson, NTT DOCOMO, "Text Proposal for E-UTRA Uplink Timing Control (Section 9.1.2.6)" TSG-RAN WG1 #43, R1-051446.

* cited by examiner

BASE STATION, MOBILE COMMUNICATION SYSTEM, MOBILE STATION AND COMMUNICATION CONTROL METHOD

TECHNICAL FIELD

The present invention relates to LTE (Long Term Evolution) systems and more particularly to base stations, mobile communication systems, mobile stations and communication control methods.

BACKGROUND ART

A communication scheme succeeding to W-CDMA and HSDPA, that is, LTE (Long Term Evolution), is discussed in a standardization group 3GPP for the W-CDMA. As radio access schemes for the LTE, OFDM (Orthogonal Frequency Division Multiplexing) and SC-FDMA (Single-Carrier Frequency Division Multiple Access) are discussed for downlink and uplink, respectively. For example, see 3GPP TR 25.814 (V7.0.0), "Physical Layer Aspects for Evolved UTRA", June 2006.

The OFDM is a scheme where a frequency band is divided into smaller frequency bands (subcarriers) and data is transmitted in these frequency bands. According to the OFDM, it is possible to achieve faster transmission and improve frequency utilization efficiency by arranging the subcarriers in the frequency band densely without mutual interference while allowing overlapping of the subcarriers.

The SC-FDMA is a scheme where a frequency band is divided and the resulting frequency bands are used for different terminals, which can reduce interference among the terminals. According to the SC-FDMA, variations of transmit power can be reduced, resulting in less consumption of power in the terminals and wider coverage.

In the LTE system, a base station (eNB: eNodeB) controls receive timings of signals received in uplink channels from simultaneously accessing mobile stations such that the receive timings can be within a CP length. In addition, the base station controls transmit timings of the mobile stations through downlink signaling in order to maintain orthogonality among the mobile stations.

In the case where a mobile station is currently communicating to the base station, the base station may control the transmit timing based on the receive timing of a pilot signal transmitted from the mobile station. In the case where a mobile station attempts to start communications to the base station, on the other hand, the base station may control the transmit timing based on the receive timing of a RACH (Random Access Channel) transmitted from the mobile station.

For the above downlink signaling, an amount of the transmit timing adjusted in the mobile station may be defined as follows, the adjustment amount=(minimum unit of the adjustment amount)×k, where k is $-K_1, -K_1+1, \ldots, -1, 0, 1, \ldots, K_2-1, K_2$.

In the formula, $-K_1$ through $K_2$ corresponds to a range of the adjustment amount of the transmit timing, and as that range is wider, a greater number of bits is required for the downlink signaling.

DISCLOSURE OF INVENTION

Problem to be Solved by the Invention

However, the above-mentioned background art has some problems as follows.

In the state where communications are to be initiated or substantially the same state as the communication initiation due to established communications but ongoing off-communications (which are collectively referred to as "the communication initiation state" hereinafter), the transmit timing may be controlled based on an adjustment amount range different from the adjustment amount range for the transmit timing during communications. Specifically, since the transmit timing of a mobile station may significantly deviate from a proper timing in the communication initiation state, a larger adjustment amount range may be required to control the transmit timing. On the other hand, since the transmit timing of the mobile station may not deviate from the proper timing relatively during communications, a smaller adjustment amount range may be required to control the transmit timing.

If the larger adjustment amount range is used in conformity with the communication initiation state, a greater number of bits may be required in the downlink signaling to control the transmit timing, resulting in an increase in signaling overhead and accordingly a smaller amount of communication capacity. In contrast, if the smaller adjustment amount range is used in conformity with the ongoing communication state, the transmit timing could not be controlled properly under the communication initiation state.

Thus, the present invention addresses the above-mentioned problem. One object of the present invention is to provide a base station, a mobile communication system, a mobile station and a communication control method that can control the transmit timing in uplink transmissions properly with limited signaling overhead by defining different adjustment amount ranges of transmit timings adapted for the communication initiation state and ongoing communication state.

Means for Solving the Problem

In order to overcome the above problem, one aspect of the present invention relates to a base station for communicating to a mobile station wherein the mobile station transmits an uplink signal in accordance with a SC-FDMA scheme or an OFDMA scheme, the base station comprising: an adjustment amount range setting unit configured to set an adjustment amount for adjusting a transmit timing of the uplink signal to have different ranges depending on types of a channel transmitted by the mobile station when the base station indicates the adjustment amount to the mobile station.

According to the aspect, it is possible to indicate the adjustment amount for adjusting the transmit timing to the mobile station with an optimal number of signaling bits for channel types of uplink signals.

Another aspect of the present invention relates to a base station for communicating to a mobile station wherein the mobile station transmits an uplink signal in accordance with a SC-FDMA scheme or an OFDMA scheme, the base station comprising: a range setting unit configured to set an adjustment amount for adjusting a transmit timing of the uplink signal to have different ranges depending on types of a downlink control signal when the base station indicates the adjustment amount to the mobile station in the downlink control signal transmitted by the base station.

One aspect of the present invention relates to a mobile communication system including a mobile station and a base station communicating to the mobile station, wherein the mobile station transmits an uplink signal in accordance with a SC-FDMA scheme or an OFDMA scheme, and the base station includes a range setting unit configured to set an adjustment amount for adjusting a transmit timing of the uplink signal to have different ranges depending on types of a channel transmitted by the mobile station when the base station indicates the adjustment amount to the mobile station.

According to the aspects, it is possible to indicate the adjustment amount for adjusting the transmit timing to the mobile station with an optimal number of signaling bits for channel types of uplink signals.

Another aspect of the present invention relates to a mobile communication system including a mobile station and a base station communicating to the mobile station, wherein the mobile station transmits an uplink signal in accordance with a SC-FDMA scheme or an OFDMA scheme, and the base station includes a range setting unit configured to set an adjustment amount for adjusting a transmit timing of the uplink signal to have different ranges depending on types of a downlink control signal when the base station indicates the adjustment amount to the mobile station in the downlink control signal transmitted by the base station.

One aspect of the present invention relates to a communication control method in a base station communicating to a mobile station, the method comprising: receiving an uplink signal transmitted from the mobile station in accordance with a SC-FDMA scheme or an OFDMA scheme; indicating an adjustment amount for adjusting a transmit timing of the uplink signal to the mobile station; and changing a range of the adjustment amount depending on types of a channel transmitted by the mobile station.

According to the aspects, it is possible to indicate the adjustment amount for adjusting the transmit timing to the mobile station with an optimal number of signaling bits for channel types of uplink signals.

Another aspect of the present invention relates to a communication control method in a base station communicating to a mobile station, the method comprising: receiving an uplink signal transmitted from the mobile station in accordance with a SC-FDMA scheme or an OFDMA scheme; indicating an adjustment amount for adjusting a transmit timing of the uplink signal to the mobile station in a downlink control signal for setting the adjustment amount to different ranges depending on types of the downlink control signal when the adjustment amount is indicated in the downlink control signal transmitted by the base station; and changing a range of the adjustment amount at the mobile station based on the received downlink control signal.

One aspect of the present invention relates to a mobile station for communicating to a base station, the mobile station comprising: an uplink signal transmitting unit configured to transmit an uplink signal in accordance with a SC-FDMA scheme or an OFDMA scheme; and an uplink transmit timing adjustment unit configured to adjust an uplink transmit timing based on an adjustment amount for adjusting a transmit timing of the uplink signal if the base station indicates the adjustment amount to the mobile station and the adjustment amount has different ranges depending on types of a channel transmitted by the mobile station.

Another aspect of the present invention relates to a mobile station for communicating to a base station, the mobile station comprising: an uplink signal transmitting unit configured to transmit an uplink signal in accordance with a SC-FDMA scheme or an OFDMA scheme, wherein the base station indicates an adjustment amount for adjusting a transmit timing of the uplink signal to the mobile station in a downlink control signal for setting the adjustment amount to have different ranges, and the mobile station further comprises an uplink transmit timing adjustment unit configured to adjust an uplink transmit timing based on the received downlink control signal.

Advantage of the Invention

According to the embodiments of the present invention, a base station, a mobile communication system, a mobile station and a communication control method can control the transmit timing in uplink transmissions properly with limited signaling overhead by defining different adjustment amount ranges of transmit timings adapted for the communication initiation state and ongoing communication state.

LIST OF REFERENCE SYMBOLS

50: cell
$100_1$, $100_2$, $100_3$, $100_n$: mobile station
$110_1$, $110_2$, $110_3$, $110_n$: mobile station
102: receive and transmit antenna
104: amplification unit
106: transmitting and receiving unit
108: baseband processing unit
110: call processing unit
112: application unit
1081: timing adjustment amount management unit
200: base station
202: transmit and receive antenna
204: amplification unit
206: transmitting and receiving unit
208: baseband processing unit
210: call processing unit
212: channel interface
2081: channel interface
2082: MAC processing unit
2083: RLC processing unit
2084: UL transmit timing control unit
300: access gateway apparatus
400: core network

BEST MODE FOR CARRYING OUT THE INVENTION

Hereinafter, the best mode of implementing the present invention is described through the following embodiments with reference to the drawings.

Throughout all the drawings illustrating the embodiments, components and elements having the same function are referred to as the same reference symbols and are not described repeatedly.

Figure 1:
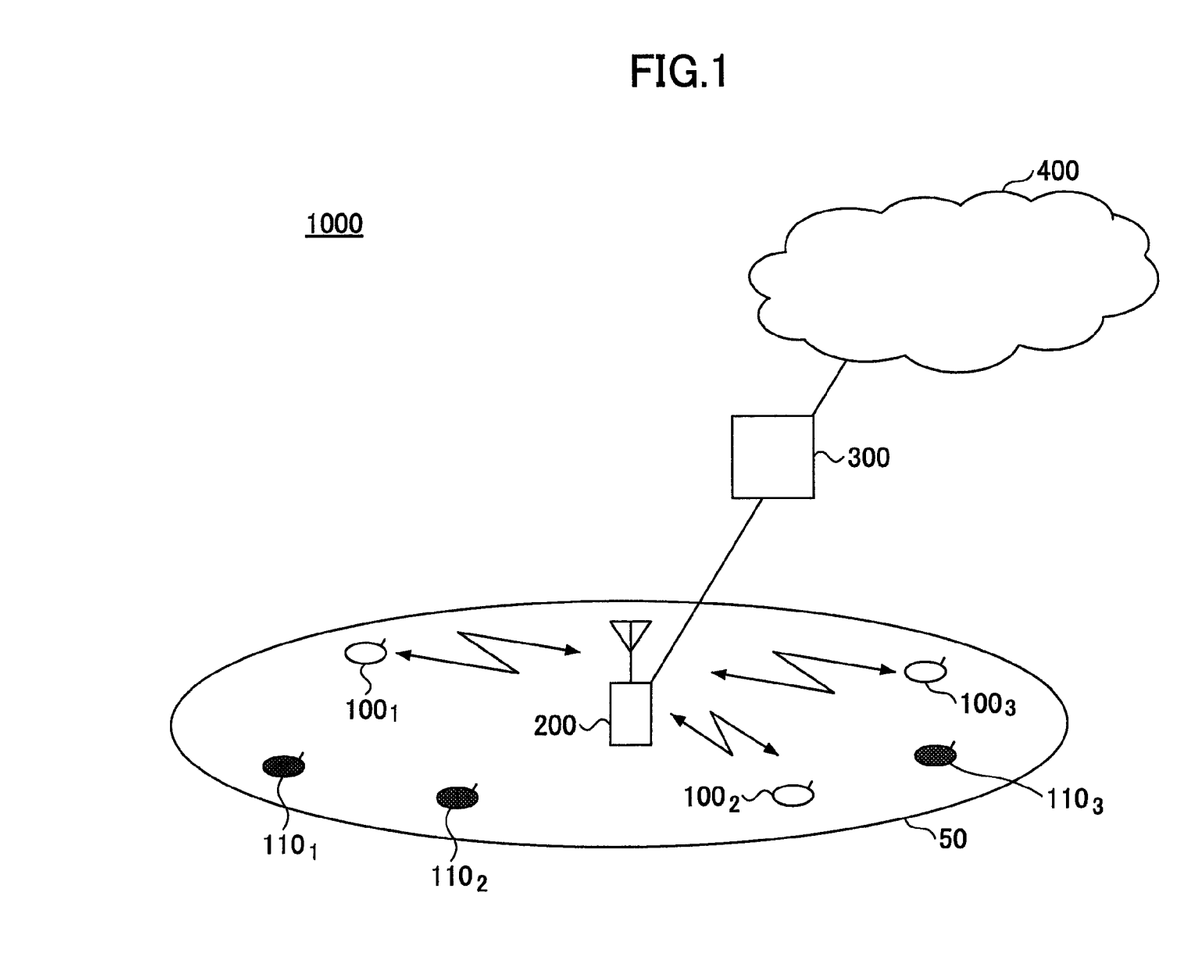
FIG. 1 is a block diagram illustrating an arrangement of a radio communication system according to embodiments of the present invention.

A radio communication system adapted for a base station according to embodiments of the present invention is described with reference to FIG. 1.

A radio communication system 1000 is a system to which Evolved UTRAN and UTRAN (may be referred to as Long Term Evolution or Super 3G) may be applied, for example. The radio communication system 1000 includes a base station (eNB: eNodeB) 200, multiple mobile stations (UE: User Equipment) $100_n$ ($100_1$, $100_2$, $100_3$, ..., $100_n$: n is a positive integer) presently communicating to the base station 200, and multiple mobile stations $110_m$ ($110_1$, $110_2$, $110_3$, ..., $110_m$: m is a positive integer) that are in the state where they attempt to initiate communications to the base station 200 or in substantially the same state as the communication initiation state due to ongoing off-communications. The base station 200 is connected to an upper station such as an access gateway apparatus 300, which is in turn connected to a core network 400.

In this embodiment, the mobile stations $100_n$ are communicating to the base station 200 in a cell 50 in the Evolved UTRA and UTRAN. It can be estimated that uplink signals transmitted from the mobile stations $100_n$ fall within a receiving window of the base station 200 or are in the neighborhood of the receiving window. As stated below, the base station 200 measures receive timings of uplink signals from the mobile stations $100_n$ such as reference signals for sounding and CQI reporting signals. When the receive timings change due to variations of propagation environments and/or migration of the mobile stations $100_n$, the base station 200 computes an adjustment amount for the transmit timings of the uplink signals from the mobile stations $100_n$ to achieve proper receive timings and transmits the computed adjustment amount to the mobile stations $100_n$ as physical layer control information or MAC layer control information.

On the other hand, the mobile stations $110_m$ reside at the cell 50 in the state where the mobile stations $110_m$ attempt to initiate communications to the base station 200 in the Evolved UTR and UTRAN or in substantially the same state as the communication initiation state due to ongoing off-communications. Thus, it cannot be estimated whether uplink signals transmitted from the mobile stations $110_m$ may fall within a receiving window of the base station 200 or deviate from the receiving window significantly. At this time, the mobile stations $110_m$ transmits RACH (Random Access Channel) before initiation or resuming of communications. As stated below, the base station 200 computes optimal transmit timings for the mobile stations $110_m$ and adjustment amounts of the transmit timings of the RACH from the mobile stations $110_m$ based on receive timings of the RACH and transmits the adjustment amounts to the mobile station $110_m$ as an informational element of RACH responses. In this embodiment, the receiving window of the base station 200 is defined by CP length and timing of Fast Fourier Transform (FFT) processing.

Since the mobile stations $100_n$ ($100_1$, $100_2$, $100_3$, ..., $100_n$) have the same arrangement, functionality and condition, the mobile station $100_n$ is described below unless specifically stated. From the viewpoint of adjustment of uplink transmit timings according to the present invention, the adjustment amount for adjusting uplink transmit timing of the mobile station $100_n$ presently communicating to the base station 200 is computed based on receive timings of reference signals for sounding and/or CQI reporting channels. Also, the adjustment amount is transmitted in downlink channels to the mobile station $100_n$ as physical layer control information or MAC layer control information.

In addition, since the mobile stations $110_m$ ($110_1$, $110_2$, $110_3$, ..., $110_m$) have the same arrangement, functionality and conditions, the mobile station $110_m$ is described below unless specifically stated otherwise. From the viewpoint of adjustment of uplink transmit timings according to the present invention, for the mobile station $110_m$ being in the state where the mobile station $110_m$ attempts to initiate communications to the base station 200 in the Evolved UTRA and UTRAN or in substantially the same state as the communication initiation state due to ongoing off-communications, the adjustment amount for adjusting the uplink transmit timing is computed based on the RACH. Also, the adjustment amount is transmitted in downlink channels to the mobile station $110_m$ as some of control information in RACH responses.

In the radio communication system 1000, the OFDM and the SC-FDMA are applied as radio access schemes to downlink and uplink channels, respectively. As stated above, the OFDM is a scheme where a frequency band is divided into multiple smaller frequency bands (subcarriers) and data is transmitted in the frequency bands. The SC-FDMA is a scheme where a frequency band is segmented and the segmented frequency band is used for different terminals, resulting in reduction in interference among the terminals.

A communication channel in the Evolved UTRA and UTRAN is described.

For downlink channels, a PDSCH (Physical Downlink Shared Channel) shared among the mobile stations $100_n$ and a LTE downlink control channel are used. In other words, the downlink channels may mean the PDSCH and the LTE downlink control channel. In the downlink channels, the LTE downlink control channel is used to transmit information on users and/or transport formats mapped to downlink shared physical channels, acknowledgement information on uplink shared physical channels and others. The downlink shared physical channel is used to transmit user data.

For uplink channels, a PUSCH (Physical Uplink Shared Channel) shared among the mobile stations $100_n$ and a LTE uplink control channel are used. In other words, the uplink channels may mean the PUSCH and the LTE uplink control channel. The uplink control channel includes two types of channels, a channel time-multiplexed with the PUSCH and a channel frequency-multiplexed with the PUSCH.

In the uplink channels, the LTE uplink control channel is used to transmit downlink quality information or CQI (Channel Quality Indicator) used for scheduling and AMCS (Adaptive Modulation and Coding Scheme) in the downlink shared physical channels and acknowledgement information or HARQ ACK information on the downlink shared physical channels. Also, user data is transmitted in the PUSCH.

Figure 2:
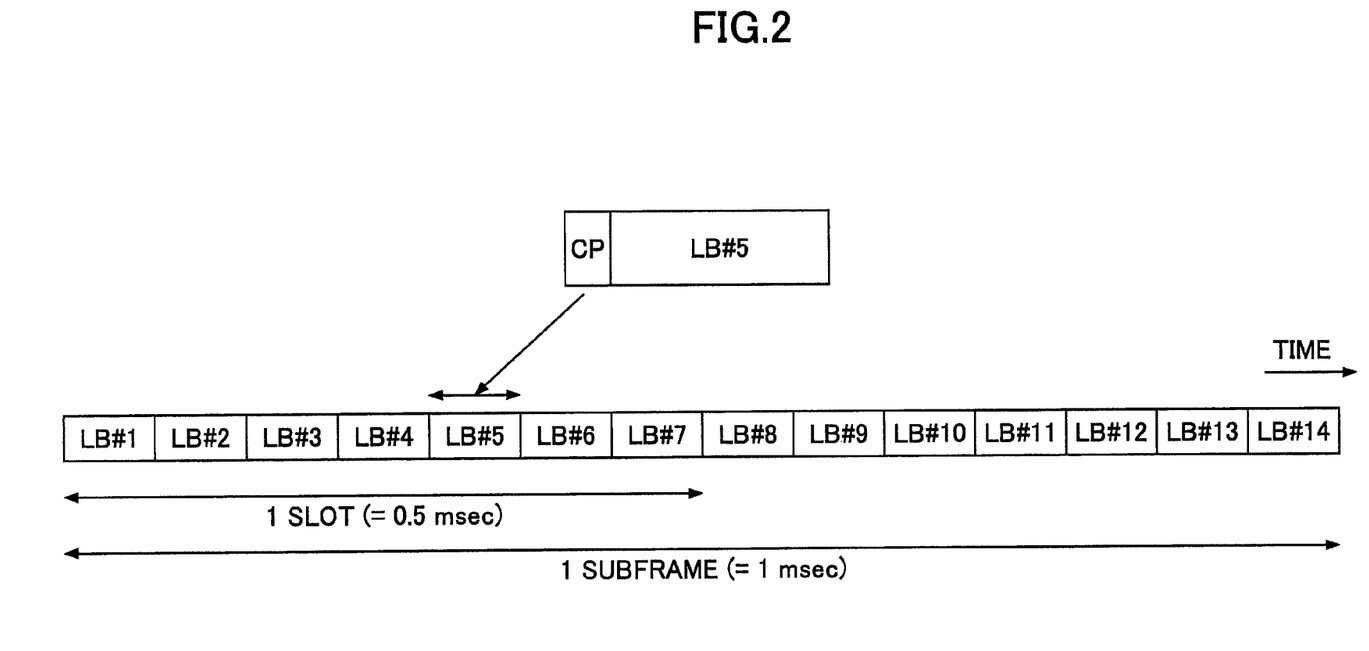
FIG. 2 illustrates an exemplary arrangement of a subframe and a slot.

In uplink transmissions, as illustrated in FIG. 2, it is discussed that seven long blocks are used for each slot. A reference signal (pilot signal) for data demodulation, that is, a demodulation reference signal, is mapped to one of the seven long blocks. A reference signal (pilot signal) for sounding, that is, a sounding reference signal, for use of scheduling, uplink transmit power control and/or determination of a transmit format of the PUSCH in AMC are transmitted in one or more of the seven long blocks other than the long block mapped to the demodulation reference signal. In the long blocks for transmitting the sounding reference signals, the sounding reference signals from multiple mobile stations are multiplexed in accordance with CDM (Code Division Multiple). The demodulation reference signal is mapped to the fourth and eleventh long blocks in one subframe, for example.

The above-mentioned long blocks may be referred to as SC-FDMA symbols. Since a single subframe consists of two slots, the single subframe consists of 14 long blocks as illustrated in FIG. 2.

Figure 3:
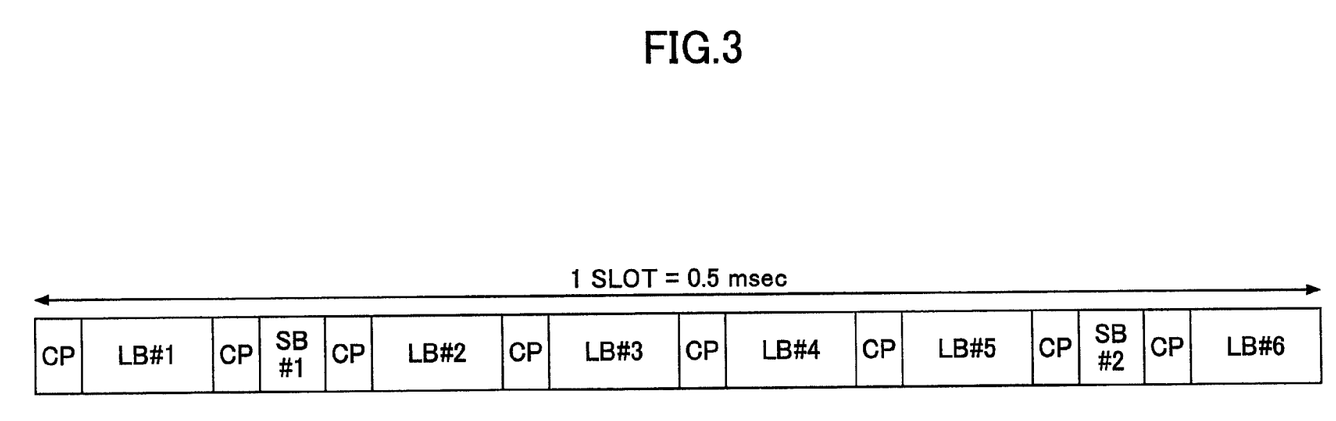
FIG. 3 illustrates an exemplary arrangement of a slot.

Alternatively, it is discussed that two short blocks (SBs) and six long blocks (LB) are used for each slot as another uplink transmission format as illustrated in FIG. 3. The long blocks are mainly used to transmit data and control information. A reference signal (pilot signal) for sounding, that is, a sounding reference signal, for use of scheduling, uplink transmit power control and/or determination of a transmit format of the PUSCH in AMC is mapped to one or more of the six long blocks. In the long blocks for transmitting the sounding reference signals, the sounding reference signals from multiple mobile stations are multiplexed in CDM. The two short blocks are used to transmit a reference signal (pilot signal) for data demodulation, that is, demodulation reference signals.

Figure 4:
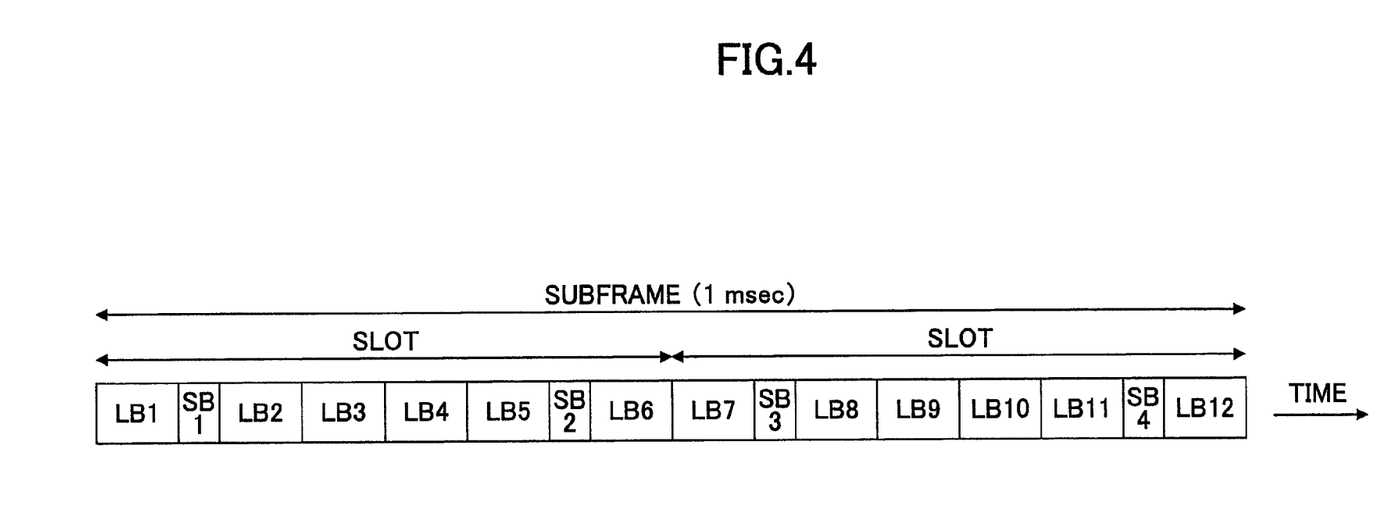
FIG. 4 illustrates an exemplary arrangement of a subframe.

Since a single subframe consists of two slots, the single subframe consists of four short blocks and twelve long blocks as illustrated in FIG. 4.

Figure 5:
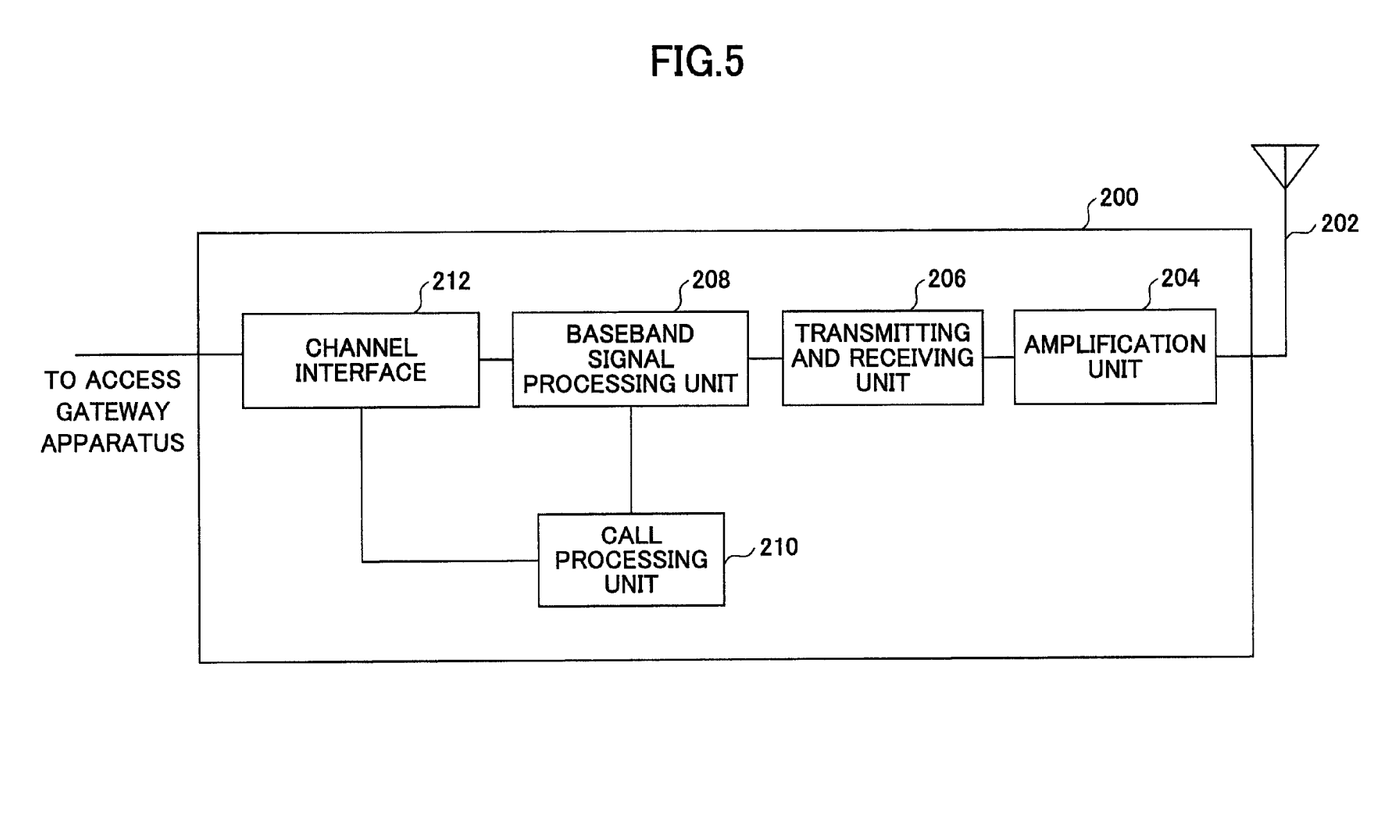
FIG. 5 is a partial block diagram illustrating a base station according to one embodiment of the present invention.

Next, a base station 200 according to one embodiment of the present invention is described with reference to FIG. 5.

In this embodiment, the base station 200 includes a transmit and receive antenna 202, an amplification unit 204, a transmitting and receiving unit 206, a baseband signal processing unit 208, a call processing unit 210 and a channel interface 212.

Packet data to be transmitted from the base station 200 to the mobile station $100_n$ in a downlink channel is supplied from an upper station of the base station 200, such as the access gateway apparatus 300, to the baseband signal processing unit 208 via the channel interface 212.

The baseband signal processing unit 208 performs various operations including segmentation and concatenation of packet data, transmission operations in an RLC layer such as transmission operations associated with RLC (Radio Link Control) retransmission control, MAC retransmission control, HARQ (Hybrid Automatic Repeat reQuest) transmission operations, scheduling, transmission format selections, channel coding, and IFFT (Inverse Fast Fourier Transform) operations and forwards resultant data to the transmitting and receiving unit 206.

The transmitting and receiving unit 206 performs frequency conversion to convert a baseband signal supplied from the baseband signal processing unit 208 into a signal with a radio frequency band. Then, the transmitting and receiving unit 206 transmits the signal with the radio frequency band amplified by the amplification unit 204 via the transmit and receive antenna 202.

On the other hand, for data transmitted from the mobile stations $100_n$ and $110_m$ to the base station 200 in uplink channels, the amplification unit 204 amplifies a radio frequency signal received at the transmit and receive antenna 202. The transmitting and receiving unit 206 frequency-converts the resultant radio frequency signal into a baseband signal and supplies the baseband signal to the baseband signal processing unit 208.

The baseband signal processing unit 208 performs various operations on the incoming baseband signal including FFT operations, error correction decoding, reception operations associated with MAC retransmission control and reception operations in RLC layer and forwards the resultant signals to the access gateway apparatus 300 via the channel interface 212.

Also, the baseband signal processing unit 208 measures a receive timing of an uplink signal transmitted from the mobile station $100_n$, computes an adjustment amount for adjusting the transmit timing of the mobile station $100_n$ to accommodate the uplink signal within a receiving window of the base station 200, and reports the adjustment amount to the mobile station $100_n$. Note that the receiving window of the base station 200 is defined by timing of FFT (Fast Fourier Transform) operations and CP length.

In addition, the baseband signal processing unit 208 computes an optimal transmit timing of the mobile station $110_m$ and an adjustment amount for transmit timing of a RACH transmitted from the mobile station $110_m$ based on receive timing of the RACH and reports the adjustment amount to the mobile station $110_m$.

The call processing unit 210 performs state management and/or resource allocation for the base station 200.

Figure 6:
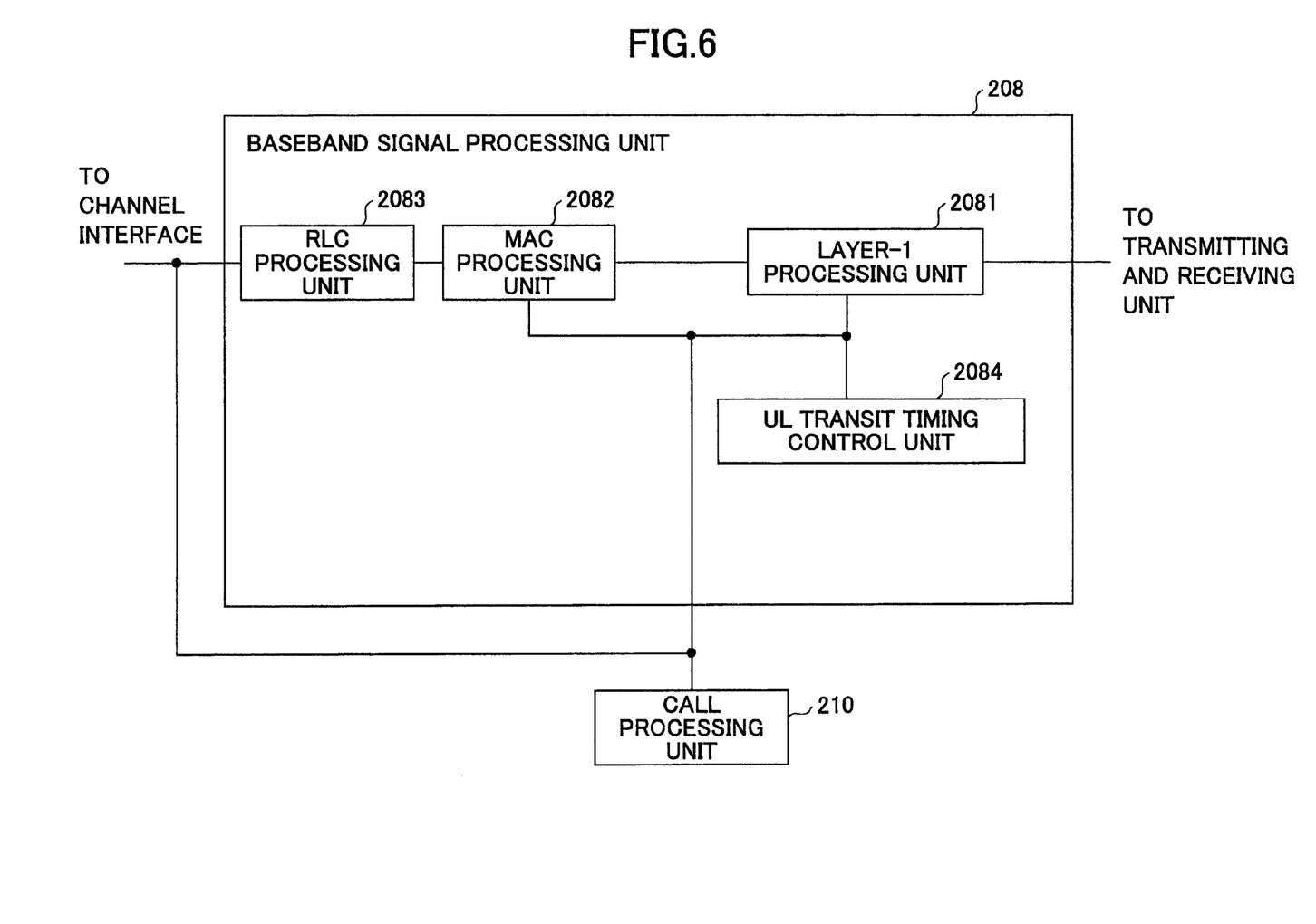
FIG. 6 is a block diagram illustrating an exemplary baseband unit in a base station according to one embodiment.

Next, an arrangement of the baseband signal processing unit 208 is described with reference to FIG. 6.

The baseband signal processing unit 208 includes a layer-1 processing unit 2081, a MAC (Medium Access Control) processing unit 2082, a RLC processing unit 2083 and an UL (Uplink) transmit timing control unit 2084.

In the baseband signal processing unit 208, the layer-1 processing unit 2081, the MAC processing unit 2082, the UL transmit timing control unit 2084 and the call processing unit 210 are coupled to each other.

The layer-1 processing unit 2081 performs channel encoding and/or IFFT operations on data transmitted in downlink channels and/or channel decoding and/or FFT operations on data transmitted in uplink channels. Also, the layer-1 processing unit 2081 measures receive timing of a signal transmitted from the mobile station $100_n$ and informs the UL transmit timing control unit 2084 of receive timing position information indicative of position of the receive timing within the receiving window. In the layer-1 processing unit 2081, uplink reference receive timing (referred to as a reference FFT timing hereinafter) is predetermined for downlink transmit timing, for example, based on cell radius. In this embodiment, the reference FFT timing is assumed to be receive timing where a mobile station residing at a cell boundary may conduct transmissions at the shortest timing without delayed transmit timing, for example. Then, the information indicative of transmit timing (UL transmit timing control signal), which is transmitted in downlink channels from the base station 200, is determined such that receive timing of an uplink signal ideally transmitted from the mobile station based on the UL transmit timing control signal becomes the reference FFT timing.

Figure 7:
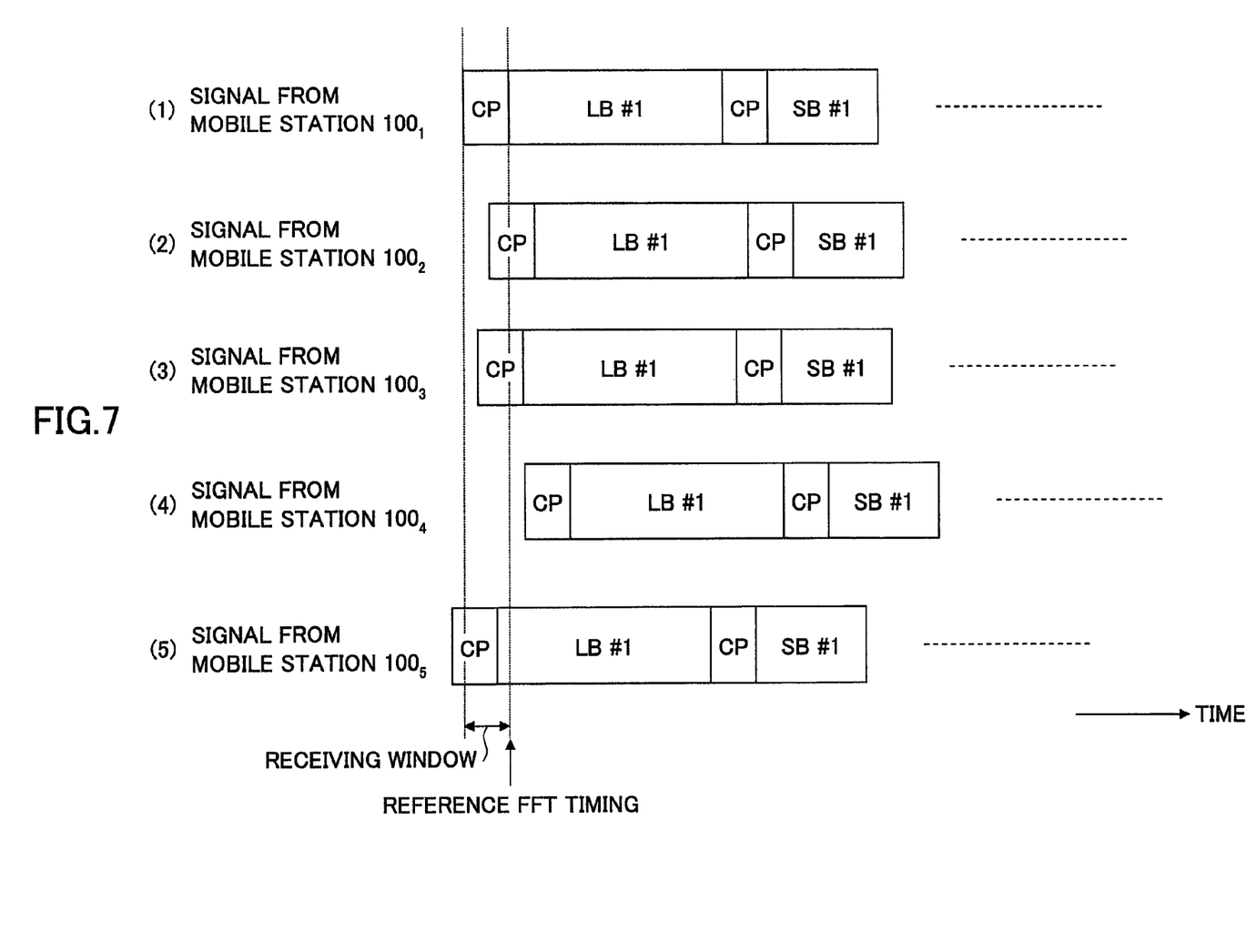
FIG. 7 illustrates a receive timing from a mobile station and a receiving window in a base station according to one embodiment of the present invention.

For example, the layer-1 processing unit 2081 may use uplink reference signals such as sounding reference signals to detect signal receive timings of the respective mobile stations $100_n$. As a result, the receive timings of the mobile stations $100_1$-$100_5$ may be detected as illustrated in FIG. 7. In FIG. 7, the head portion of a subframe is illustrated. Although FIG. 7 illustrates a single path, it is required for multiple paths to accommodate all paths having a relatively higher receive power within the receiving window.

The layer-1 processing unit 2081 computes a difference between a reference FFT timing and an optimal receive timing for each mobile station (which may be referred to as an optimal FFT timing hereinafter), for example, the optimal FFT timing minus the reference FFT timing for each mobile station, and supplies the computed difference as receive timing position information to the UL transmit timing control unit 2084. As stated above, the uplink sounding reference signal may be used to detect the receive timing for each mobile station. Alternatively, if some characteristics may be improved, the CQI, feedback channels or demodulation reference signals may be used.

In addition, the layer-1 processing unit 2081 measures a receive timing of a RACH transmitted from the mobile station $110_m$ and transmits to the UL transmit timing control unit 2084 receive timing position information indicative of position of the receive timing within the receiving window. The mobile station $110_m$ has the same uplink reference receive timing (reference FFT timing) as the mobile station $110_n$.

The layer-1 processing unit 2081 computes a difference between the reference FFT timing and the optimal receive timing for each mobile station (which may be referred to as an optimal FFT timing hereinafter) derived from the RACH receive timing, for example, the optimal FFT timing for each mobile station minus the reference FFT timing, and supplies the computed difference as the receive timing position information to the UL transmit timing control unit 2084.

The MAC processing unit 2082 serves to perform transmission for MAC retransmission control of downstream data such as HARQ, perform scheduling or select transmission formats. Also, the MAC processing unit 2082 performs receptions for MAC retransmission control of uplink data and others.

In addition, if the UL transmit timing control unit 2084 instructs the MAC processing unit 2082 to transmit a UL transmit timing control signal indicative of an uplink transmit timing such as timing advance (TA) to the mobile station $100_n$, the MAC processing unit 2082 transmits the TA to the mobile station $100_n$. The TA may be transmitted as control information in physical layers or control information in MAC layers, for example.

Also, if the UL transmit timing control unit 2084 instructs the MAC processing unit 2082 to transmit an UL transmit timing control signal indicative of a transmit timing to the mobile station $110_m$, such as the TA, based on a receive timing of RACH transmitted from the mobile station $110_m$, the MAC processing unit 2082 transmits the TA to the mobile station $110_m$. The TA may be transmitted as an information element included in a RACH response.

The RLC processing unit 2083 performs transmissions in RLC layers for downlink packet data such as segmentation and concatenation or transmissions for RLC retransmission control and/or receptions in the RLC layers for uplink data such as segmentation and concatenation or receptions for RLC retransmission control.

The UL transmit timing control unit 2084 transmits an UL transmit timing control signal, such as TA, to each mobile station $100_n$ via the MAC processing unit 2082 or the layer-1 processing unit 2081 for adjusting the receive timing of the mobile station $100_n$ based on the receive timing position information of the mobile station $100_n$ transmitted from the layer-1 processing unit 2081 if necessary. In other words, the UL transmit timing control unit 2084 determines a transmit timing to accommodate receive timings of multipath signals received at receiving ends of the base station 200 from the multiple mobile stations $100_n$ simultaneously within a CP (Cyclic Prefix) length. The UL transmit timing control unit 2084 transmits to the mobile station $100_n$ via the MAC processing unit 2082 or the layer-1 processing unit 2081 an adjustment amount of the transmit timing to be adjusted by the mobile station $100_n$ to achieve the above transmit timing as the UL transmit timing control signal. In this embodiment, the adjustment amount of the transmit timing may be derived by subtracting the reference FFT timing from the optimal FFT timing for each mobile station, for example. In other words, the adjustment amount may be computed so as to make the difference between the optimal FFT timing for each mobile station and the reference FFT timing equal to zero.

In this embodiment, the UL transmit timing control unit 2084 defines the transmit timing adjustment amount to be adjusted by the mobile station $100_n$ as the adjustment amount=(the minimum unit of the adjustment amount)×$k$, where $k=-K_1, -K_1+1, \ldots, -1, 0, 1, \ldots, K_2-1, K_2$. The UL transmit timing control unit 2084 transmits the k as an UL transmit timing control signal to the mobile station $100_n$. In this embodiment, $-K_1$ through $K_2$ corresponds to a range of the transmit timing adjustment amount. Then, since the base station 200 has established communications to the mobile station $100_n$ and uplink signals transmitted from the mobile station $100_n$ are considered to be within or near the receiving window of the base station 200, the UL transmit timing control unit 2084 sets the $K_1$ and $K_2$ to small values. Each mobile station $100_n$ controls transmit timing based on the UL transmit timing control signal transmitted from the base station 200, resulting in receive timings of uplink signals transmitted to the receiving end of the base station 200 from the mobile stations $100_n$ being within the CP length and thus keeping the orthogonality between the mobile stations.

In addition, the UL transmit timing control unit 2084 transmits the UL transmit timing control signal such as TA to the mobile station $110_m$ via the MAC processing unit 2082 for adjusting the receive timing of the mobile station $110_m$ based on the receive timing position information of RACH transmitted from the mobile stations $110_m$ and reported from the layer-1 processing unit 2081. In other words, the UL transmit timing control unit 2084 determines a transmit timing to accommodate receive timing of multipath signals received at the receiving end of the base station 200 from multiple mobile stations $110_m$ simultaneously within the CP length. Then, the UL transmit timing control unit 2084 transmits to the mobile station $110_m$ via the MAC processing unit 2082 an adjustment amount to be adjusted by the mobile station $110_m$ as the UL transmit timing control signal to achieve the determined transmit timing. In this embodiment, the transmit timing adjustment amount may be computed by subtracting the reference FFT timing from the optimal FFT timing for each mobile station, for example. In other words, the adjustment amount may be computed to make the difference between the optimal FFT timing for each mobile station and the reference FFT timing equal to zero. If the UL transmit timing control unit 2084 receives a RACH transmitted from the mobile station $110_m$, the UL transmit timing control unit 2084 instructs the MAC processing unit 2082 to transmit the adjustment amount to the mobile station $110_m$ at a predefined timing.

In this embodiment, the UL transmit timing control unit 2084 defines the transmit timing adjustment amount as the adjustment amount=(the minimum unit of the adjustment amount)×$k$, where $k=-K_3, -K_3+1, \ldots, -1, 0, 1, \ldots, K_4-1, K_4$. The UL transmit timing control unit 2084 transmits the k as an UL transmit timing control signal to the mobile station $110_m$. In this embodiment, $-K_3$ through $K_4$ corresponds to a range of the transmit timing adjustment amount.

Then, the UL transmit timing control unit 2084 sets the $K_3$ and $K_4$ to greater values because it cannot be determined whether the mobile station $110_m$ is in the state where the mobile station $110_m$ attempts to initiate communications or in substantially the same state as the communication initiation state due to ongoing off-communications and whether uplink signals transmitted from the mobile station $110_m$ are within or out of the receiving window of the base station 200.

For example, the UL transmit timing control unit 2084 may set the minimum unit of the adjustment amount as 0.5 μs and specify the $K_1$ through $K_4$ as $K_1=K_2=7$ and $K_3=K_4=1023$. At this time, four bits are required for the transmit timing adjustment amount transmitted to the mobile station $100_n$ while eleven bits are required for the transmit timing adjustment amount transmitted to the mobile station $110_m$. Thus, a smaller number of bits may be required for the transmit timing adjustment amount transmitted to the mobile station $100_n$ than to the mobile station $110_m$. In other words, a range of the adjustment amount of TA transmitted as control information in the physical layers during communications or control information in the MAC layers may be set to be smaller than a range of the TA transmitted as a part of RACH response information at the communication initiation.

Also, for example, the UL transmit timing control unit 2084 may define the adjustment amount of transmit timing for transmission to the mobile station $100_n$ asymmetrically with respect to the plus and minus directions. In other words, the UL transmit timing control unit 2084 may set the minimum unit of the adjustment amount as 0.5 μs and specify the $K_1$ through $K_4$ as $K_1=K_2=8$, $K_3=512$ and $K_4=1024$. Alternatively, the UL transmit timing control unit 2084 may set the minimum unit of the adjustment amount as 0.5 μs and specify the $K_1$ through $K_4$ as $K_1=K_2=8$, $K_3=1024$ and $K_4=512$. In other words, a range of the adjustment amount of the TA transmitted as control information in the physical layers or control information in the MAC layers during communications may be set to be symmetric while the range of the TA transmitted as a part of RACH response information at the communication initiation may be set to be asymmetric.

In addition, for example, the UL transmit timing control unit 2084 may set the adjustment amount of transmit timing for transmissions to the mobile station $100_n$ as well as the adjustment amount of transmit timing for transmission to the mobile station $110_m$ to be asymmetric with respect to the plus and minus directions. Thus, the UL transmit timing control unit 2084 may set the minimum unit of the adjustment amount as 0.5 μs and may specify the $K_1$ through $K_4$ as $K_1=8$, $K_2=16$, $K_3=512$ and $K_4=1024$. In other words, the range of the adjustment amount of the TA transmitted as the control information in the physical layer or the control information in the MAC layer during communications as well as the range of the TA transmitted as a part of the RACH response information at the communication initiation may be set to be asymmetric.

In addition, for example, the minimum unit of the transmit timing adjustment amount for transmission to the mobile station $100_n$ may be set to be smaller while the minimum unit of the transmit timing adjustment amount for transmission to the mobile station $110_m$ may be set to be greater. Thus, the UL transmit timing control unit 2084 may set the minimum unit of the transmit timing adjustment amount for transmission to the mobile station $100_n$ as 0.5 μs and the minimum unit of the transmit timing adjustment amount for transmission to the mobile station $110_m$ as 1.0 μs. In other words, the minimum unit of the adjustment amount of TA transmitted as the control information in the physical layer or the control information in the MAC layer during communications may be set to be smaller that the minimum unit of the adjustment amount of TA transmitted as a part of the RACH response information at the communication initiation.

Note that both the base station 200 and the mobile stations must know the range of the transmit timing adjustment amount reported to the mobile station $100_n$, that is, the range of TA during communications, as well as the range of the transmit timing adjustment amount reported to the mobile station $110_m$, that is, the range of TA at the communication initiation, in advance. In other words, the two TA ranges are defined as fixed system parameters in the radio communication system 1000.

Next, the mobile station $100_n$ or $110_m$ according to one embodiment of the present invention is described with reference to FIG. 8. The mobile station $100_n$ and $110_m$ have the same arrangement, although they are differently designated depending on the respective communication states of communications to the base station 200 during communications or at communication initiation.

Figure 8:
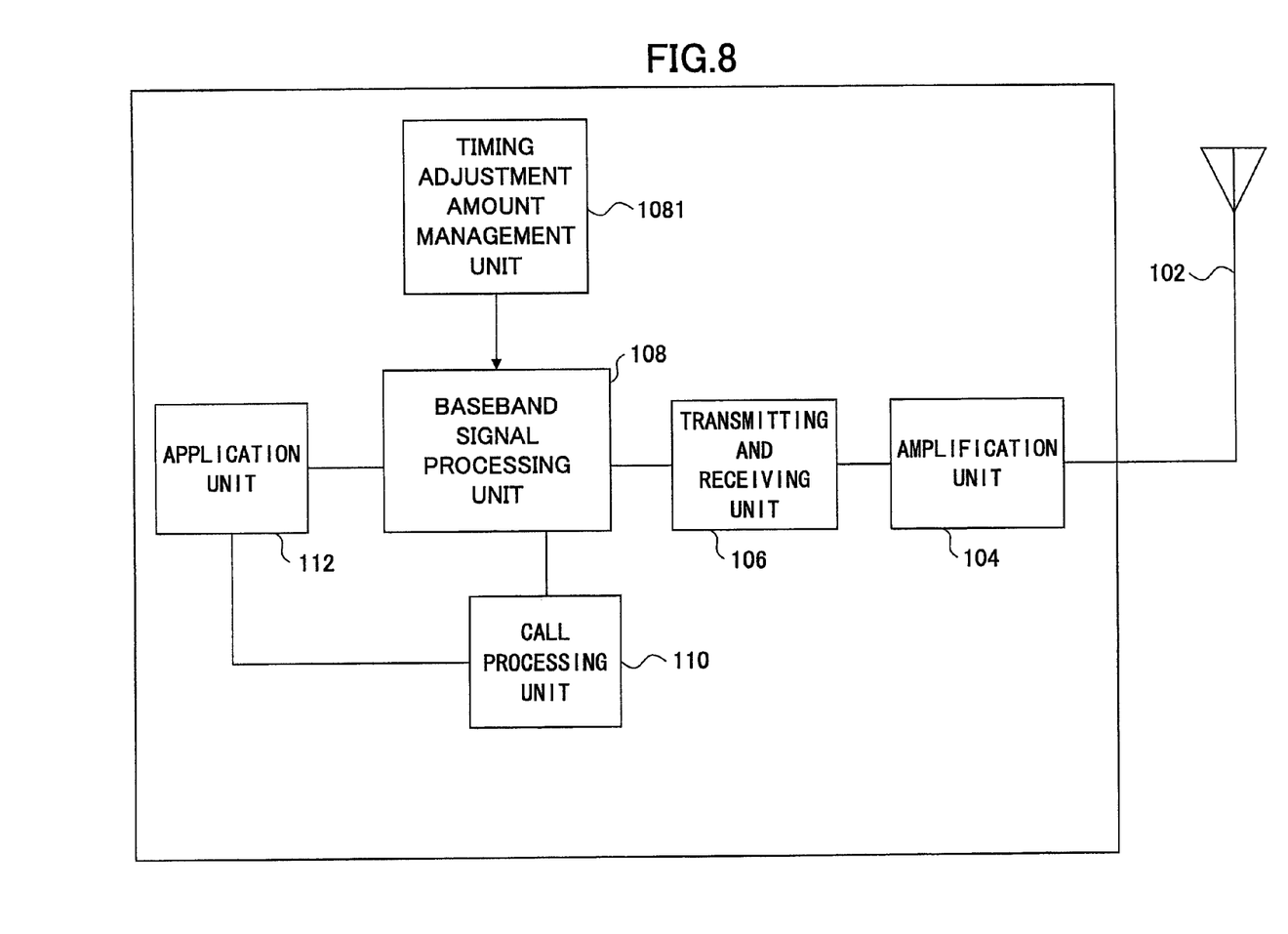
FIG. 8 is a partial block diagram illustrating a mobile station according to one embodiment of the present invention.

In FIG. 8, the mobile station $100_n$ or $110_m$ includes a transmit and receive antenna 102, an amplification unit 104, a transmitting and receiving unit 106, a baseband signal processing unit 108, a call processing unit 110 and an application unit 112.

For downlink data, radio frequency signals received at the transmit and receive antenna 102 are amplified at the amplification unit 104 and then frequency converted into baseband signals at the transmitting and receiving unit 106. The baseband signal processing unit 108 performs operations including FFT operation, error correction decoding and reception associated with retransmission control on the baseband signals, and then the resultant signals are forwarded into the application unit 112.

On the other hand, uplink packet data is supplied from the application unit 112 to the baseband signal processing unit 108. The baseband signal processing unit 108 performs transmission associated with retransmission control (HARQ), transmission format selection, channel encoding, DFT operation, IFFT operation and others on the uplink packet data and forwards the resultant signals to the transmitting and receiving unit 106.

The transmitting and receiving unit 106 performs frequency conversion for converting the baseband signals supplied from the baseband signal processing unit 108 into a radio frequency band, which is amplified in the amplification unit 104 and transmitted from the transmit and receive antenna 102.

Also in the mobile station $100_n$ presently communicating to the base station 200, the baseband processing unit 108 decodes TA transmitted in downlink channels as control signals in the physical layer or control signals in the MAC layer and adjusts uplink transmit timing based on the decoding result. In this embodiment, the timing adjustment amount management unit 1081 holds information on definition and range of the TA transmitted as the control signals in the physical layer or the MAC layer and transmits the definition and range to the baseband signal processing unit 108. Then, the baseband signal processing unit 108 adjusts the transmit timing of uplink signals based on the definition and range of the TA transmitted as the control signals in the physical layer or the MAC layer and actually received TA. In this embodiment, the definition and range of TA transmitted as a part of the control signals in the physical layer or the MAC layer are the same as those in the UL transmit timing control unit 2084 in the base station 200, and thus description thereof is omitted.

Also, in the mobile station $110_m$ attempting to initiate communications to the base station 200, the baseband signal processing unit 108 decodes TA transmitted in downlink channels as a part of control signals in RACH responses and adjusts uplink transmit timing based on the decoding result. In this embodiment, the timing adjustment amount management unit 1081 holds information on definition and range of the TA transmitted as a part of the control signals in the RACH response and transmits the definition and range to the baseband signal processing unit 108. Then, the baseband signal processing unit 108 adjusts transmit timing of uplink signals based on the definition and range of the TA transmitted as a part of the control signals in the RACH responses and actually received TA. In this embodiment, the definition and range of TA transmitted as a part of the control signals in the physical layer or the MAC layer are the same as those in the UL transmit timing control unit 2084 in the base station 200, and thus description thereof is omitted.

The call processing unit 110 manages communications to the base station 200. The application unit 112 performs operations associated with upper layers from the physical layer or the MAC layer.

The above-mentioned information on the range of the transmit timing adjustment amount reported to the mobile station $100_n$, that is, the TA range during communications, and the information on the range of the transmit timing adjustment amount reported to the mobile station $110_m$, that is, the TA range at the communication initiation, have to be identical to each other and are preferably defined as system common parameters or fixed values.

Figure 9:
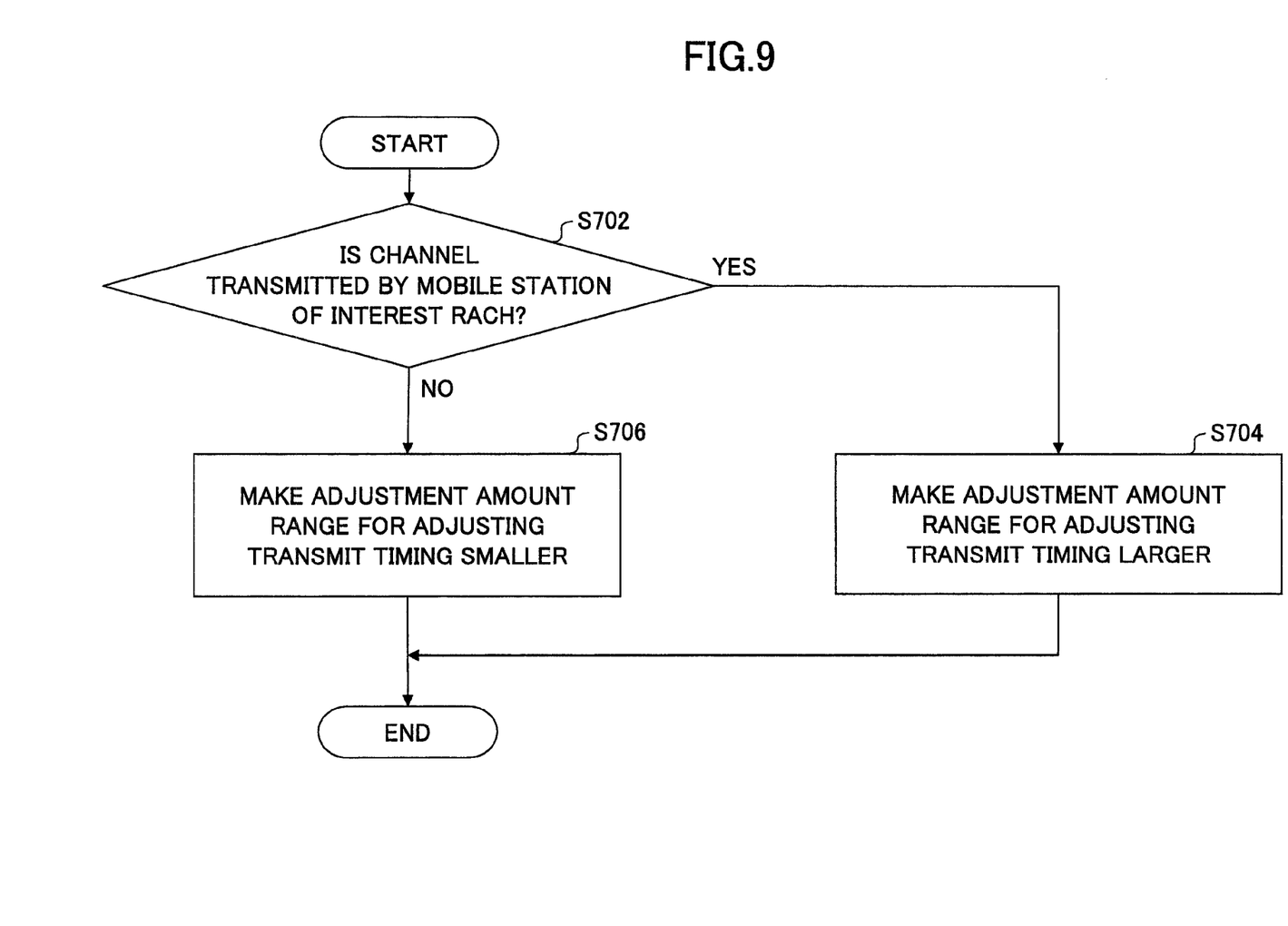
FIG. 9 is a flow diagram illustrating a communication control method according to one embodiment of the present invention.

Next, a transmission control method for the base station 200 according to this embodiment is described with reference to FIG. 9.

At step S702, when the UL transmit timing control unit 2084 determines an UL transmit timing control signal, such as a TA, for adjusting receive timing of a mobile station, the UL transmit timing control unit 2084 determines whether the mobile station transmits a RACH as a primary channel.

If the channel transmitted by the mobile station is the RACH (S702:YES), the UL transmit timing control unit 2084 defines a larger adjustment amount range for adjusting transmit timing. For example, at step S704, the UL transmit timing control unit 2084 may define the transmit timing adjustment amount to be adjusted by the mobile station as the adjustment amount=(the minimum unit of the adjustment amount)×$k$, where $k=-K_3, -K_3+1, \ldots, -1, 0, 1, \ldots, K_4-1, K_4$. In addition, the UL transmit timing control unit 2084 may set the $K_3$ and $K_4$ as $K_3=K_4=1023$.

On the other hand, if the channel transmitted by the mobile station is not the RACH (S702: NO), that is, if the channel is a secondary channel other than the RACH, the UL transmit timing control unit 2084 sets the transmit timing adjustment amount as a smaller value. For example, at step S706, the UL transmit timing control unit 2084 may define the transmit timing adjustment amount to be adjusted by the mobile station as the adjustment amount=(the minimum unit of the adjustment amount)×$k$, where $k=-K_1, -K_1+1, \ldots, -1, 0, 1, \ldots, K_2-1, K_2$. In addition, the UL transmit timing control unit 2084 may set the $K_1$ and $K_2$ as $K_1=K_2=7$.

Figure 10:
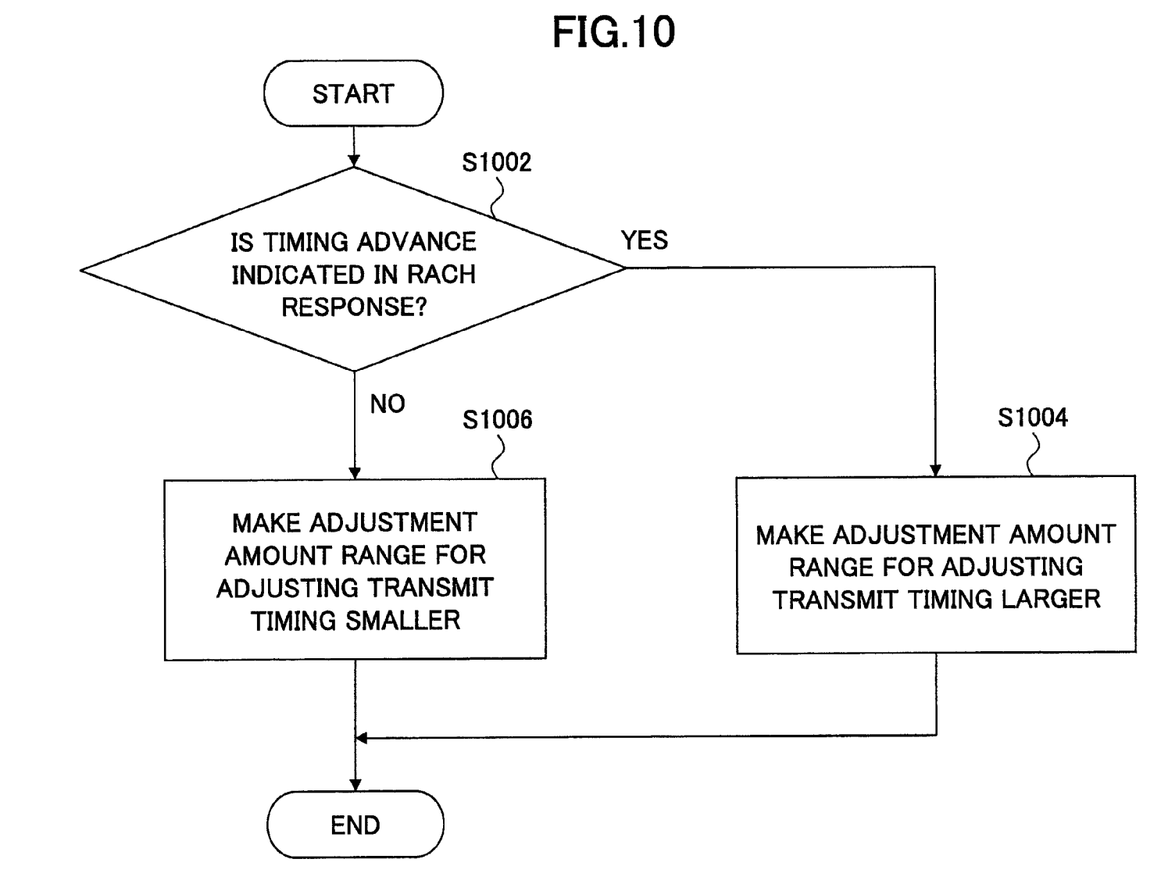
FIG. 10 is a flow diagram illustrating a communication control method according to one embodiment of the present invention.

Next, an exemplary transmission control method in the radio communication system 1000 according to this embodiment is described with reference to FIG. 10.

At step S1002, it is determined whether a TA transmitted to a mobile station is indicated in a RACH response. The indication in the RACH response means that the TA is transmitted to the mobile station as a part of control information in the RACH response.

If the TA transmitted to the mobile station is indicated in the RACH response (S1002:YES), the transmit timing adjustment amount is set to a greater value. For example, at step S1004, the transmit timing adjustment amount may be defined as the adjustment amount=(the minimum unit of the adjustment amount)×$k$, where $k=-K_3, -K_3+1, \ldots, -1, 0, 1, \ldots, K_4-1, K_4$. In addition, the $K_3$ and $K_4$ may be set as $K_3=K_4=1023$.

On the other hand, if the TA transmitted to the mobile station is not indicated in the RACH response (S1002:NO), the transmit timing adjustment amount is set to a smaller value. For example, at step S1006, the transmit timing adjustment amount may be defined as the adjustment amount=(the minimum unit of the adjustment amount)×$k$, where $k=-K_1, -K_1+1, \ldots, -1, 0, 1, \ldots, K_2-1, K_2$. In addition, the $K_1$ and $K_2$ may be set as $K_1=K_2=7$.

According to the embodiments of the present invention, different optimal transmit timing adjustment amounts can be defined for the state at the communication initiation or in ongoing off communication and for the state during communications, and thus a base station, a mobile communication system and a communication control method that can minimize overhead due to signaling and control uplink transmit timing properly can be achieved.

Although the systems complying with Evolved UTRA and UTRAN (which may be referred as to Long Term Evolution or Super 3G) are described in the above embodiments, the base station and the communication control method according to the present invention can be applied to all systems where the SC-FDMA or OFDMA (Orthogonal Frequency Division Multiplexing Access) scheme is used in uplink transmissions.

Although the present invention has been described by way of the above specific embodiments, the present invention is not limited to them. Various alternative embodiments, implementations and operations will be conceived by those skilled in the art from this disclosure.

In other words, it is understood that the present invention encompasses other embodiments not disclosed herein. Thus, the scope of the present invention can only be defined via accompanying claims.

For convenience, the present invention has been described with reference to the distinct embodiments, but separation of the embodiments is not essential to the present invention and two or more of the embodiments may be used together as needed. Some specific numerals have been used to facilitate understanding of the present invention, but unless otherwise noted, these numerals are simply illustrative and any other appropriate values may be used.

The present invention has been described with reference to the specific embodiments of the present invention, but the embodiments are simply illustrative and variations, modifications, alterations and substitutions could be contrived by those skilled in the art. For convenience of explanation, apparatuses according to the embodiments of the present invention have been described with reference to functional block diagrams, but these apparatuses may be implemented in hardware, software or combinations thereof. The present invention is not limited to the above embodiments, and variations, modifications, alterations and substitutions can be made by those skilled in the art without deviating from the spirit of the present invention.

This international patent application is based on Japanese Priority Application No. 2007-001861 filed on Jan. 9, 2007, the entire contents of which are hereby incorporated by reference.

INDUSTRIAL APPLICABILITY

A mobile communication system, a base station, a mobile station and a communication control method according to the present invention can be applied to a radio communication system.

The invention claimed is:

1. A mobile station for communicating to a base station, the mobile station comprising:
    an uplink signal transmitting unit configured to transmit an uplink signal in accordance with a SC-FDMA scheme or an OFDMA scheme; and
    an uplink transmit timing adjustment unit configured to adjust an uplink transmit timing based on an adjustment amount,
    wherein the base station signals the adjustment amount for adjusting a transmit timing of the uplink signal to the mobile station, and
    the adjustment amount having different ranges depending on types of channels already transmitted by the mobile station is determined based on a predefined reference receive timing and an optimal receive timing of the mobile station.

2. A mobile station for communicating to a base station, the mobile station comprising:
    an uplink signal transmitting unit configured to transmit an uplink signal in accordance with a SC-FDMA scheme or an OFDMA scheme; and
    an uplink transmit timing adjustment unit configured to adjust an uplink transmit timing based on a received downlink control signal,
    wherein the base station signals an adjustment amount for adjusting a transmit timing of the uplink signal to the mobile station in the downlink control signal, and
    the adjustment amount having different ranges is determined based on a predefined reference receive timing and an optimal receive timing of the mobile station.

3. The mobile station as claimed in claim 2, wherein the uplink transmit timing adjustment unit adjusts the uplink transmit timing based on the range of the adjustment amount transmitted as a control signal in a physical layer, control information in a MAC layer and an information element in a RACH response.

4. The mobile station as claimed in claim 2, wherein the uplink transmit timing adjustment unit adjusts the uplink transmit timing based on the adjustment amount set to have a larger range if the downlink control signal is a response channel to a RACH and adjusts the uplink transmit timing based on the adjustment amount set to have a smaller range if the downlink control signal is a control signal in a physical layer or a MAC layer.

5. A communication control method for use in a mobile station for communicating to a base station, the method comprising:
    transmitting an uplink signal in accordance with a SC-FDMA scheme or an OFDMA scheme; and
    adjusting an uplink transmit timing based on an adjustment amount,
    wherein the base station signals the adjustment amount for adjusting a transmit timing of the uplink signal to the mobile station, and
    the adjustment amount having different ranges depending on types of channels already transmitted by the mobile station is determined based on a predefined reference receive timing and an optimal receive timing of the mobile station.

6. A communication control method for use in a mobile station for communicating to a base station, the method comprising:
    transmitting an uplink signal in accordance with a SC-FDMA scheme or an OFDMA scheme; and
    adjusting an uplink transmit timing based on a received downlink control signal,
    wherein the base station signals an adjustment amount for adjusting a transmit timing of the uplink signal to the mobile station in the downlink control signal, and the adjustment amount having different ranges is determined based on a predefined reference receive timing and an optimal receive timing of the mobile station.

7. A mobile communication system including a mobile station and a base station communicating to the mobile station,
    wherein the mobile station transmits an uplink signal in accordance with a SC-FDMA scheme or an OFDMA scheme, and
    the base station includes a range setting unit configured to determine, when the base station signals an adjustment amount for adjusting a transmit timing of the uplink signal to the mobile station, the adjustment amount having different ranges depending on types of channels already transmitted by the mobile station based on a predefined reference receive timing and an optimal receive timing of the mobile station.

8. A mobile communication system including a mobile station and a base station communicating to the mobile station,
    wherein the mobile station transmits an uplink signal in accordance with a SC-FDMA scheme or an OFDMA scheme, and
    the base station includes a range setting unit configured to determine, when the
    base station signals an adjustment amount for adjusting a transmit timing of the uplink signal to the mobile station in a downlink control signal transmitted by the base station, the adjustment amount having different ranges depending on types of downlink control signals based on a predefined reference receive timing and an optimal receive timing of the mobile station.

* * * * *